No. 641,081. Patented Jan. 9, 1900.
P. F. COMSTOCK & A. HEDBAVNY.
PELT REFINING MACHINE.
(Application filed July 1, 1899.)
(No Model.) 6 Sheets—Sheet 1.

FIG. I.

Witnesses:
John A. Paulson
C. W. Willson

Percy F. Comstock
Anton Hedbavny
Inventors.
by Schreiter & Mathews their Att'ys.

No. 641,081. Patented Jan. 9, 1900.
P. F. COMSTOCK & A. HEDBAVNY.
PELT REFINING MACHINE.
(Application filed July 1, 1899.)

(No Model.) 6 Sheets—Sheet 2.

No. 641,081. Patented Jan. 9, 1900.
P. F. COMSTOCK & A. HEDBAVNY.
PELT REFINING MACHINE.
(Application filed July 1, 1899.)
(No Model.) 6 Sheets—Sheet 3.

No. 641,081. Patented Jan. 9, 1900.
P. F. COMSTOCK & A. HEDBAVNY.
PELT REFINING MACHINE.
(Application filed July 1, 1899.)
(No Model.) 6 Sheets—Sheet 4.
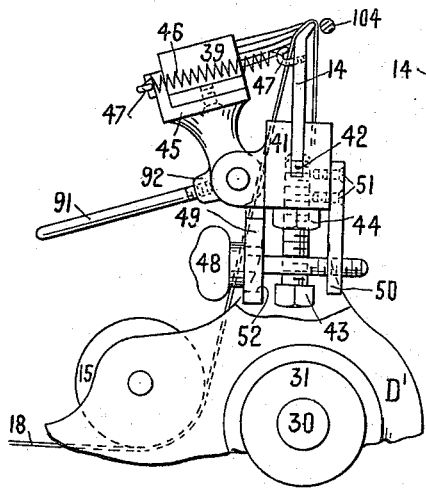
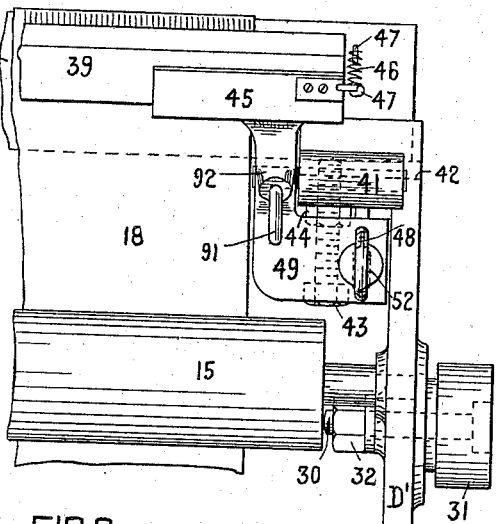
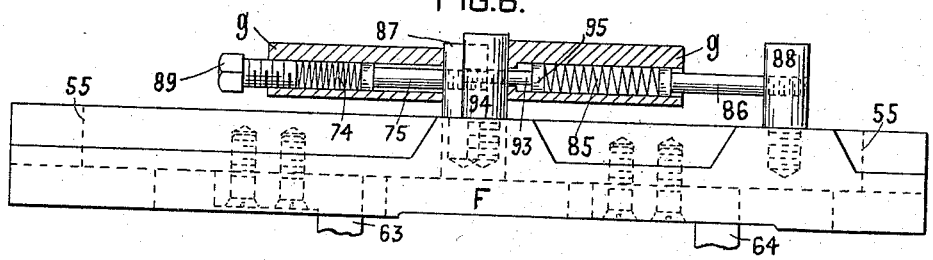
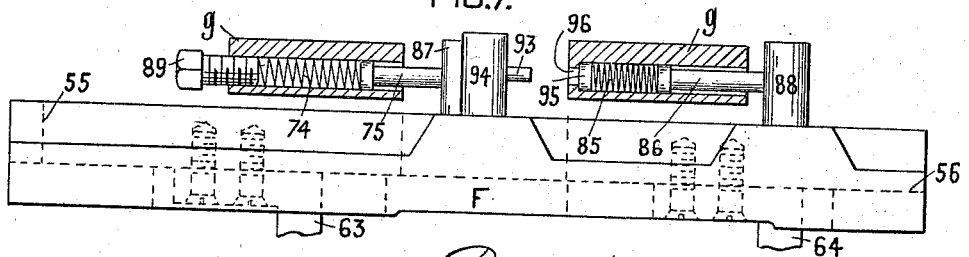

No. 641,081. Patented Jan. 9, 1900.
P. F. COMSTOCK & A. HEDBAVNY.
PELT REFINING MACHINE.
(Application filed July 1, 1899.)

(No Model.) 6 Sheets—Sheet 5.

Witnesses
John A. Paulson
E. C. Nielson

Percy F. Comstock
Anton Hedbavny
Inventors.
By Schreiter & Mathews
their Att'ys.

No. 641,081. Patented Jan. 9, 1900.
P. F. COMSTOCK & A. HEDBAVNY.
PELT REFINING MACHINE.
(Application filed July 1, 1899.)

(No Model.) 6 Sheets—Sheet 6.

Witnesses.
John A. Paulson
E. C. Nielson

Percy F. Comstock
Anton Hedbavny
Inventors.
By Schreiter & Mathews
their Att'ys.

UNITED STATES PATENT OFFICE.

PERCY F. COMSTOCK AND ANTON HEDBAVNY, OF NEW YORK, N. Y.

PELT-REFINING MACHINE.

SPECIFICATION forming part of Letters Patent No. 641,081, dated January 9, 1900.

Application filed July 1, 1899. Serial No. 722,486. (No model.)

*To all whom it may concern:*

Be it known that we, PERCY F. COMSTOCK and ANTON HEDBAVNY, of the city, county, and State of New York, have invented certain new and useful Improvements in Pelt-Refining Machines, of which the following is a full, clear, and exact specification, reference being had to the accompanying drawings, wherein—

Figure 1:
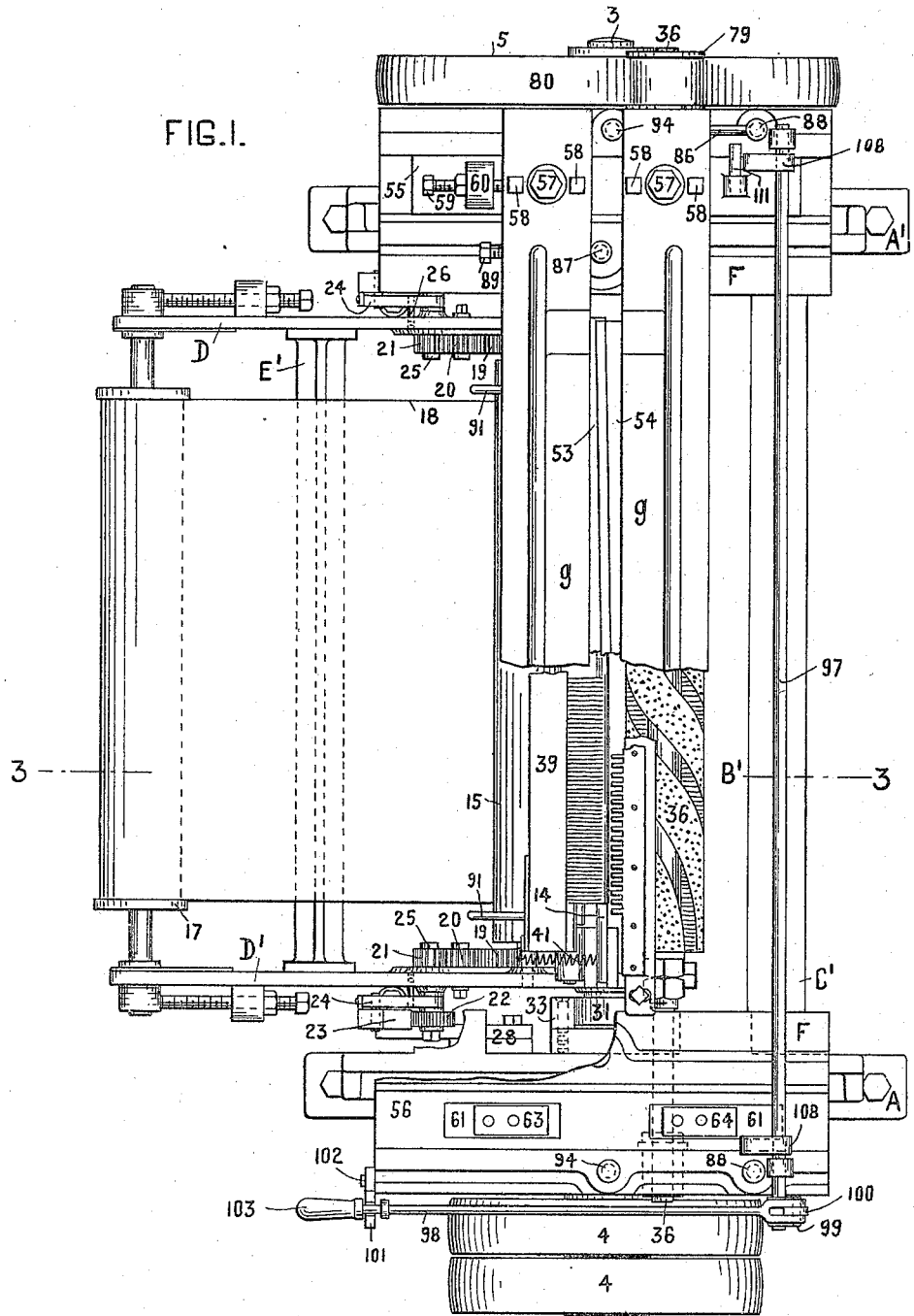
Figure 2:
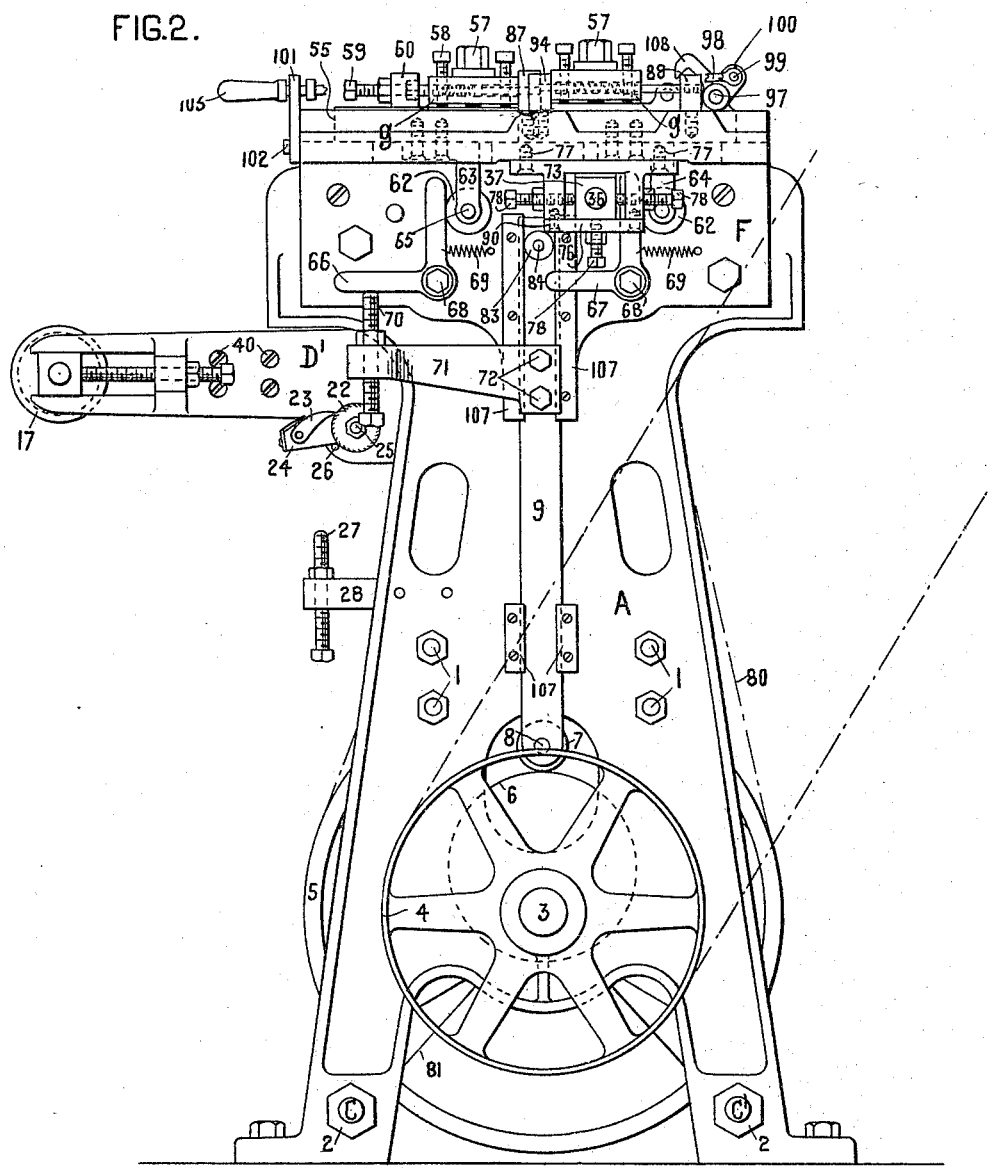
Figure 3:
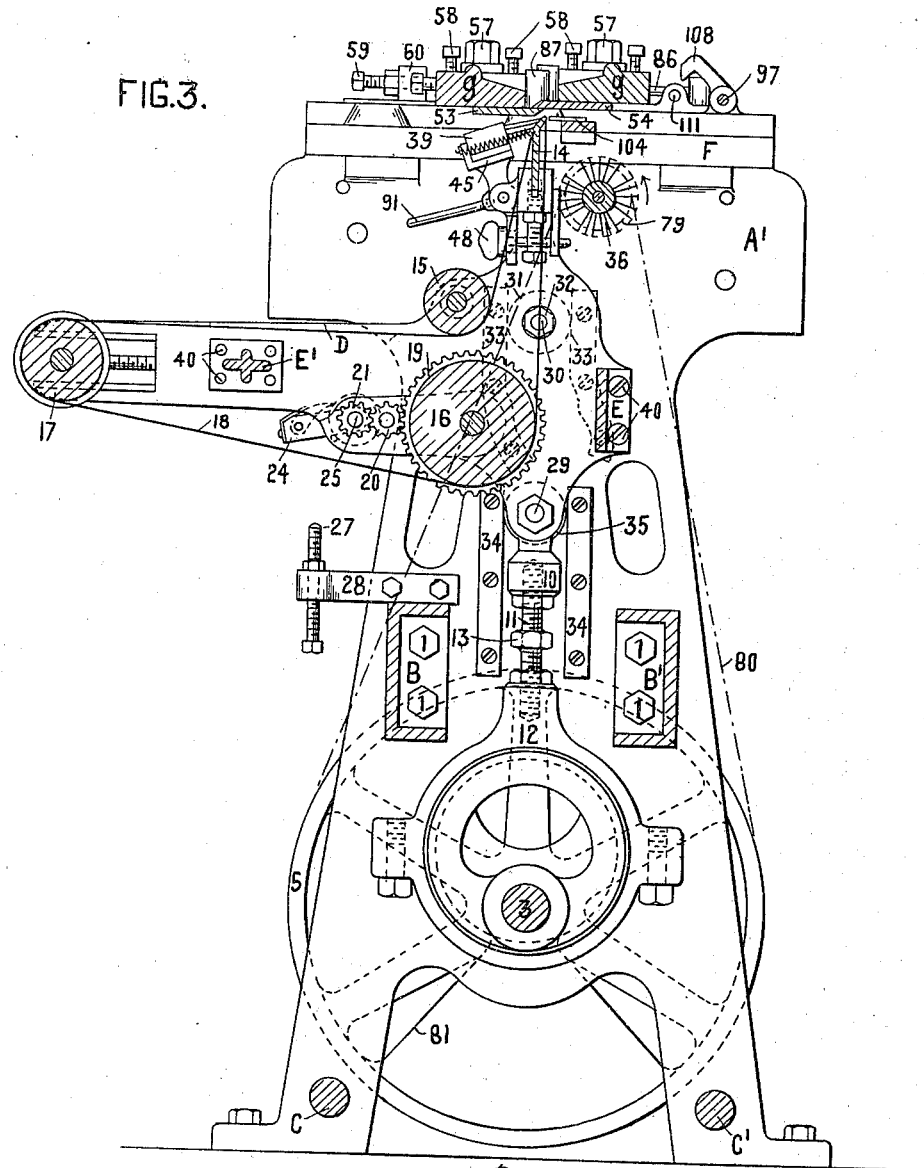
Figure 8:
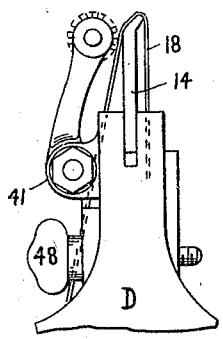
Figure 9:
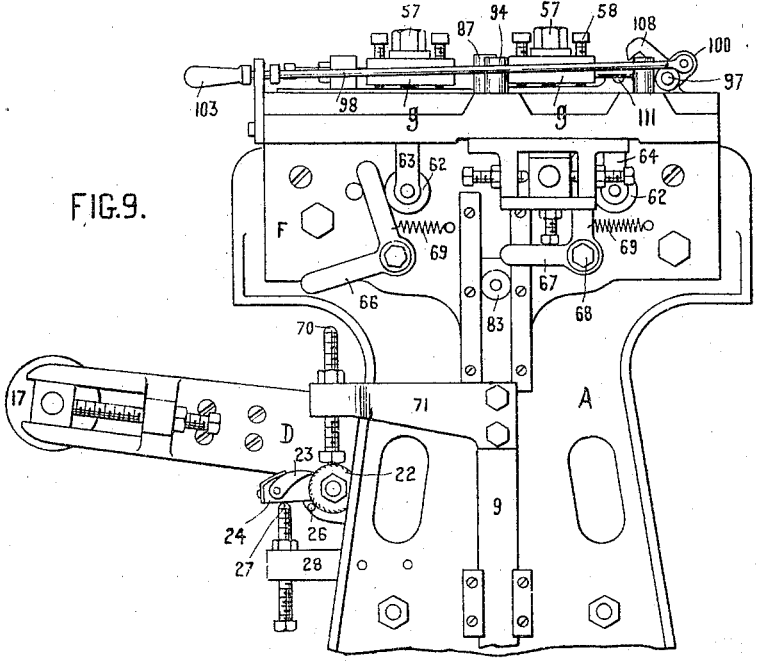
Figure 10:
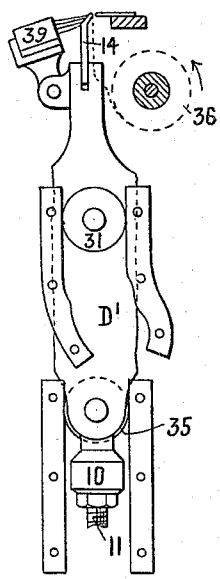
Figure 11:
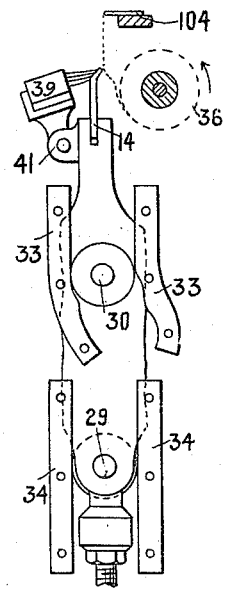
Figure 12:
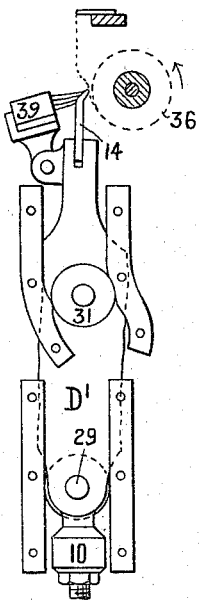
Figure 13:
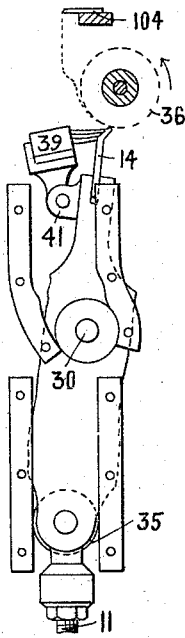
Figure 14:
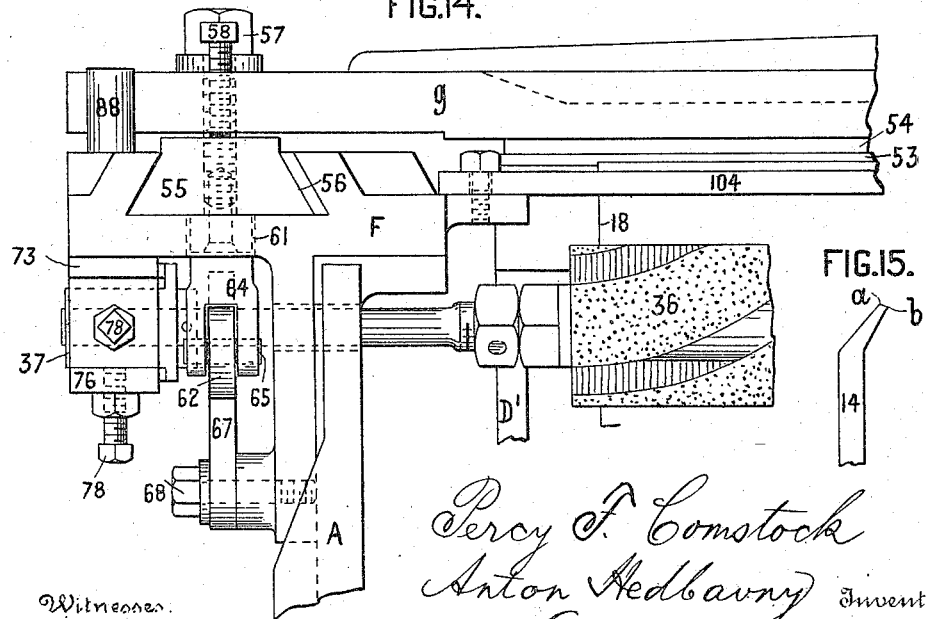
Figure 15:
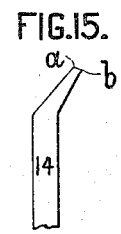

Figure 1 is a plan view of our improved machine. Fig. 2 is a side elevation; Fig. 3, a sectional view on line 3 3, indicated in Fig. 1. Fig. 4 is a side view, and Fig. 5 a front view, (enlarged details,) showing the mechanism for feeding the pelt and for retaining the fur on the front side of the stretcher-bar. Figs. 6 and 7 are elevations, partly-sectional views, of the mechanism for operating the knives. Fig. 8 is a similar view to Fig. 4, showing a rotary brush as fur-retaining device in front of the stretcher-bar. Fig. 9 is a view similar to Fig. 2, showing the relative position of some of the operating parts of the machine when the stretcher-bar is in its lowest position. Figs. 10, 11, 12, and 13 are detailed views showing successively the position of the stretcher-bar relative to the rotary brush. Fig. 14 is a part (enlarged detail) view, rear elevation, of our improved machine, showing the arrangement for adjusting the rotary brush and the arrangement for guiding and adjusting the motion of the knives. Fig. 15 is an enlarged end elevation of the stretcher-bar used in our unhairing-machine.

Similar letters and figures of reference indicate corresponding parts in all views of the drawings.

Our invention relates to pelt-refining machines; and it consists of the hereinafter-described machine for removing of water-hairs from pelts.

The frame of the machine is composed of standards A and A', joined together by ties B and B' and rods C and C'. Ties B and B' are secured to the standards A and A' by screw-bolts 1. The parts of rods C passing through corresponding bores in the standards A and A' are recessed and screw-threaded and secured by screw-nuts 2, screwed thereon.
Driving-shaft 3 of the machine is pillowed in suitable bearings in the lower part of the frame. A fast-and-loose pulley 4 is mounted on one end thereof and on the other end the belt-pulley 5, which at the same time serves as a fly or balancing wheel, as will be explained hereafter.

Inside the standards A and A' cams 6 are rigidly secured to the shaft 3, one on each end thereof. Rollers 7, mounted on pins 8, set in bars 9, engage with these cams and move bars 9 up and down as the main shaft 3 revolves. These bars slide between guideways 107 and actuate the feeding mechanism and the knives for removing the water-hairs.

The mechanism for stretching and feeding the pelt to be unhaired is mounted in a frame consisting of the side parts D and D', connected by ties E and E', riveted or screwed thereto by rivets or screws 40. The frame is supported by pivot-heads 10, adjustable connecting-rods 11, and by eccentrics 12 on driving-shaft 3. Connecting-rods 11 are right and left screw-threaded, and the pivot-heads and eccentrics 12 are provided with correspondingly-screw-threaded bores. Approximately in center of the connecting-rods 11 polygonal enlargements 13 are provided to permit grasping and turning the rods by a wrench to adjust the position of the movable frame.

In the side parts D are mounted the stretcher-bar 14 and rollers 15, 16, and 17. An endless apron 18 is stretched over the stretcher-bar and rollers, as shown in Fig. 3. Stretcher-bar 14 is set in blocks 41, integral with or rigidly secured to the side parts D and D'. The stretcher-bar is fitted snugly into notches 42 and is vertically adjusted therein by set-screws 43, which are set in correspondingly-screw-threaded bores provided in the blocks 41. These screws are locked by nuts 44 when the stretcher-bar is adjusted in position. Roller 17 is set in adjustable bearings to permit compensation for stretching of the apron. Roller 16 is the feed-roller. On its trunnions are set cog-wheels 19, gearing with idle wheels 20, which in turn engage with cog-wheels 21, set on spindles 25 of the ratchet-wheel 22. Cog-wheel 21 may be integral with ratchet-wheel 22 or secured thereto. Ratchet-wheel 22 is actuated by pawl 23, pivoted to block 24, which in turn is pivotally mounted on spindle 25, drawing the pawl 23 over the teeth of the ratchet-wheel 22 until its downward motion is arrested by pin 26.

The feeding mechanism is operated by cams 6, set on shaft 3, through bars 9 and arms 28, the block 24 abutting against the point of screw 27, set in arm 28, which causes it to partially turn on spindle 25. During this turn pawl 23 engages with and moves ratchet-wheel 22, and the motion is transmitted to the feed-roller 16, as explained above. The extent of the feed is adjusted by correspondingly setting the screw 27, whose position determines the extent of the upward motion of the block 24, and consequently the extent of the motion of the ratchet-wheel 22.

The frame containing the feeding and stretching mechanism swings on pivots 29. Its vertical up-and-down motion is guided by guideways 34, secured to the insides of standards A and A' and engaging with rollers 35, which are set on pivot 29, connecting the pivot-heads 10 to the side parts of the frame, and by rollers 31, mounted on pins 30, secured to the side parts D and D' by nuts 32. Rollers 31 glide between guideways 33, which are shaped to give the frame a forwardly-tipping motion in the latter half of its downward motion and a corresponding reverse swing in the first half of its upward motion. To balance the rocking frame in its swinging motion, the fly-wheel 5 is provided with an eccentric weight 81. This fly-wheel 5 is secured to the shaft in such position that weight 81 counterbalances the weight of the frame during its downward swing and also during the period of its return and lifting motion.

The swing of the frame moves the edge of the stretcher-bar 14 in contact with stationary rotary brush 36. This brush is mounted in adjustable bearings 37, supported in frames consisting of brackets 73, secured to plate F by screws 77, and tie 76, secured to the brackets 73 by screws 90. The bearings 37 are horizontally and vertically movable in the frame and are adjustable by set-screws 78. The brush is driven by a belt 80, stretched over fly-wheel 5 and belt-pulley 79, which is keyed to the trunnion of the brush 36, projecting beyond the bearing. The rotary brush 36 is composed of a series of rows of bristles spirally arranged upon its core. This construction of the brush is in many respects preferable and more suitable to the purposes of this machine than any other construction of brushes heretofore used in unhairing-machines. By reason of the spiral arrangement of the rows of bristles upon the core of the brush the fur and hair of the pelt is acted upon successively on the edge of the stretcher-bar and continuously along the edge from one end to the other. A full brush is defective in its action upon the pelt in that it acts upon the pelt incessantly in the same manner, and while it mats or packs the fur and hair of the pelt on the side of the stretcher-bar where it reaches it does not draw the looped fur or hair held underneath the fur-retaining device over the edge of the stretcher-bar. Thus the water-hairs are on one side of the stretcher-bar packed into and matted with the fur, while on the other side they remain in the hold of the fur-retaining device and in this manner escape the knives. A segmental brush composed of rows of bristles arranged parallel to the axis or core of the brush is an improvement over the full brush in that during the intervals occurring between the sections of the brush the water-hairs have an opportunity to rise and separate from the fur; but in other respects the effect of the brush is the same as of a full one. When, however, the brush is made of sections set spirally around its core, the advantage of the segmental brush with straight sections is obtained and in addition thereto the advantage that the bristles passing over the pelt exposed on the edge of the stretcher-bar transversely from one end to the other draw up the hairs from underneath the fur-retaining device and all looped fur, and thus produce a "clean" parting of the fur and the rising of a much greater proportion of the water-hairs than any other brush.

The path of the edge of the stretcher-bar 14 and its successive positions relative to the brush 36 are shown in Figs. 10 to 13, inclusive. In its lowermost position (shown in Fig. 13) the edge of the stretcher-bar is approximately underneath the brush 36, but not exactly in line with the axis thereof. In this position the bristles of the brush are in contact with the strip of pelt exposed on edge $a$ of the stretcher-bar (see Fig. 15) and draw the fur and hair from underneath the retaining device 39, sweeping them over this edge and successively also over the edge $b$. As the frame supporting the stretcher-bar is lifted upwardly and at the same time swings rearwardly the bristles of the brush come in contact with the pelt exposed on the narrow strip between the edge $a$ and edge $b$ of the stretcher-bar and sweep the fur and hair over the edge $b$ and downwardly to the rear side of the stretcher-bar. The pelt operated upon is stretched in a straight vertical line dropping from edge $b$ of the stretcher-bar, and as the frame continues to rise the bristles of the brush 36 come in contact with that part of the pelt below the edge $b$ until the rearward swing of the frame supporting the stretcher-bar withdraws the pelt from contact with brush 36.

It will be observed from Fig. 15 that the stretcher-bar used in our machine does not have such keen edge as the stretcher-bars heretofore used on unhairing-machines. The bearing edge of this stretcher-bar is flat approximately at right angles to the plane of the body of the bar and shifted to one side thereof. This peculiar formation of the stretcher-bar, together with the described motion of the frame supporting it, aids materially in producing the separation of the coarse water-hairs from the soft fur in that it causes the same to be bent twice, once in roots and secondly at some distance from the roots over the edge *b*, thus increasing their tendency to rise when the pelt is removed from the reach of the brush.

The fur-retaining device 39 is mounted on blocks 45, hinged to blocks 41. Springs 46, stretched between hooks 47, secured in the blocks 45 and the stretcher-bar 14, respectively, are set to draw the fur-retaining device 39 toward the stretcher-bar, and thereby to produce a uniform pressure of the fur-retaining device 39 upon the pelt fed over the stretcher-bar. This contact of the fur-retaining device with the pelt is regulated by set-screws 48, whose shanks pass through the appendices 49 of blocks 45 and through the plate 50, secured by screws 51 to blocks 41. Apertures 52, provided in the appendices 49, are sufficiently wide to allow a clearance for the shanks of screws 48. The apertures in plate 50 are screw-threaded correspondingly with the shanks of set-screws 48. By screwing set-screws 48 deeper into the bores in plates 50 the retaining device 39 is drawn farther away from the apron 18, whereas by unscrewing them the springs 46 are permitted to draw the retaining device 39 more closely in contact with the pelt fed over the stretcher-bar. Handle 91, screwed in boss 92, serves as means for withdrawing the fur-retaining device from contact with the pelt when required for inspection or other purpose. By means of this mechanism the fur-retaining device 39 can be adjusted to operate upon the pelts of various thickness with practically constant pressure and permits also the unhairing of unequally thick pelts without changing or readjusting the operating parts of the machine.

It is well known that on some parts of a pelt the fur and hair is more thickly set than on others and also variously long. With the devices heretofore in use it was not possible to unhair such pelts uniformly because the parts set more thickly with fur and hair were retained by the retaining device in front of the stretcher-bar and more of the water-hairs escaped the action of the shearing devices, whereas, again, in the more thinly-set parts or in places where the fur is shorter, parts of the fur escaped the retaining device and were sheared off together with the water-hairs on the edge of the stretcher-bar. The fur-retaining device shown in the drawings is a flat stationary brush with relatively long bristles. In practicing our invention we do not, however, intend to be limited to using this kind of retaining device, because in place of the flat stationary brush a cylindrical rotary brush, as shown in Fig. 8 of the drawings, or a card or comb may as well be used and will be found preferable for some kinds of pelts. These modifications or changes in the kind of retaining device involve merely the changing of the implement; but its operation will always be as described with reference to the fur-retaining device 39. (Shown in detail in Figs. 4 and 5 in the drawings.)

A stationary fur-retaining device 104 is mounted in the stationary frame above the brush 36 and in line with edge *b* of the stretcher-bar. This fur-retaining device may be a rod, as shown in Fig. 4, or a comb, as shown in Figs. 10 to 13, inclusive, or a brush. It serves for holding down the fur brushed over the edge *b* of the stretcher-bar to prevent its being injured by the devices removing the water-hairs.

In combination with this machine any kind of hair-removing devices may be used. In the machine illustrated in the drawings we show shearing-knives 53 and 54, which are mounted on plates *g*, and though we claim the specific construction of these hair-removing devices and of the combinations of the mechanism for operating the same we do not intend to limit ourselves to this particular implement, as it is possible to use any other kind of the known hair-removing devices instead. The shearing-knives 53 and 54 are both movable, and they may be set to move parallel or at an angle to each other. They are made in the shape of shearing-blades and adjusted by set-screws 58, governing their horizontal position in exact relation to each other. Plates *g* are secured by screws 57 to blocks 55, fitted in dovetailed grooves 56, provided in plates F. The lateral position of the knife 53 is adjusted by set-screws 59 passing through screw-threaded bores in bosses 60. This lateral adjustment is limited to the extent of the slot through which the shanks of screws 57, securing plate *g*, pass. These slots are not shown in the drawings, being covered by the flanges of screws 57. Knife 54 is also laterally adjustable to such extent, but this adjustment would not be sufficient to place the knives sufficiently in angular position relatively to each other. If that is desired, such change is accomplished by shifting plates *g* in their fastenings to blocks 55. For this purpose additional screw-threaded bores are provided in blocks 55. Plates F are provided with longitudinal slots 61 parallel to the dovetailed grooves 56 to admit brackets 63 and 64, respectively, to be affixed to blocks 55 from below. The dropping arms of brackets 63 and 64 are bifurcated, and rollers 62 are set on pins 65 between the side bars of the bifurcated arms. These rollers engage with bell-crank levers 66 and 67, oscillating on screw-bolts 68. Springs 69 are provided to hold the vertical arms of the bell-crank levers 66 and 67 in contact with the rollers 62. The vertical arms of bell-crank levers 66 engage with rollers 62, set in the dropping arms of brackets 63. Their horizontal arms are engaged by the points of screws 70, screwed in arms 71, secured to bars 9 by screws 72. Screws 70 engage with the horizontal arms of bell-crank levers 66 at every upward motion of bars 9 at the time when the stretcher-bar has nearly reached its uppermost position and cause the bell-crank levers to move knife 53 toward the knife 54 and approximately in line with the edge *a* of the stretcher-bar or slightly beyond. Knife 53 is held in this position until after the knife 54, which was receded by the same upward motion of bars 9, as will be explained hereinafter, is released and coacts with it in shearing off the water-hairs protruding on the edge of the stretcher-bar. When bars 9 descend, knife 53 is receded by the reaction of springs 74, which were compressed by plungers 75 during the forward motion of the knife. The rollers pillowed in the bifurcated ends of the brackets 64 are engaged by the vertical arms of bell-crank levers 67. Rollers 83, mounted on pins 84, set in the upper ends of bars 9, engage with the ends of horizontal arms of brackets 67 when bars 9 are lifted from their lowermost position, and as the bars are moved upwardly they cause bell-crank levers 67 to move knife 54 away from the knife 53. This receding motion is continued until rollers 83 slip off of the ends of the horizontal arms of brackets 67. This occurs at the moment when the stretcher-bar 14 reaches its highest position. When the knife 54 is thus released, springs 85, inserted in bores provided in plates *g*, supporting the knife, and which by the receding action of the knife have been compressed against plungers 86, react and drive knife 54 against knife 53, which at that moment stands still. The knives then coact as shears in cutting off the water-hairs protruding on the edge of the stretcher-bar. Plungers 75 and 86 are adjustably secured in studs 87 and 88, respectively. Set-screws 89, closing the bores provided in plates *g*, serve as a means for adjusting the tensity of those springs.

It is necessary to reduce the momentum of knife 54 when it comes in contact with the knife 53. For this purpose pins 93, set in studs 94, and plugs 95 are provided. Plugs 95 are set in the bores containing the springs 85. Pins 93, set opposite to bores 96, enter into these bores when the springs 85 react, as shown in Fig. 6, and abutting against plugs 95 reduce to some extent the momentum of the forward motion of knife 54. The shearing action of the knives may be suspended by arresting knife 54 when receded by means of snap-hooks 108, engaging with pins 111, secured to blocks 55, supporting the knife. These hooks are set on shaft 97 and are operated by rod 98, pivoted by pin 99 to lever 100, which is rigidly secured to the shaft. Rod 98 passes through bearing-plate 101, secured to plate F by screws 102, and terminates into handle 103, located within easy reach of the operator of the machine.

The machine works as follows: The pelts to be refined are basted to the endless apron 18 and are successively drawn by the feed of the apron underneath the fur-retaining device 39. When the rocking frame swings on its downward motion, the strip of pelt stretched over the bar 14 comes into contact with the rotary brush 36, which draws from underneath the fur-retaining device 39 the fur and hair rooted in the strip of pelt exposed between edges *a* and *b* of the stretcher-bar and successively brushes them over the edge *b* of the stretcher-bar, as explained above. On the return motion of the frame and when the contact between the pelt and brush 36 ceases the water-hairs by reason of greater resiliency and hardness rise, whereas the fur remains in the position into which it was brought by the action of the rotary brush. The rocking frame then moves farther upward and the fur comes in contact with the guarding device 104, mounted in the stationary frame. This retaining device may be a bar, as shown in Fig. 4, or a comb or brush, as shown in Figs. 1, 3, and 10 to 13, inclusive. Its function is to hold the fur down to the rear side of the stretcher-bar, while the water-hairs, standing upright on the strip between the edges *a* and *b* of the stretcher-bar, are brought in the opening between the knives 53 and 54 and are removed.

We claim as our invention—

1. A pelt-refining machine comprising a stationary frame, a shaft, a rotary brush and a stationary guard mounted in the stationary frame; means for removing water-hairs from pelts and mechanism for operating these means from the shaft, a vertically-movable rocking frame, set in guideways affixed to the stationary frame; a stretcher-bar, means for intermittently feeding the pelts over the stretcher-bar and a fur-retaining device mounted in the rocking frame; eccentrics set on the shaft, pivotal joints, connecting the rocking frame to the eccentrics; means for driving the shaft and means for driving the rotary brush in the direction of the feed of the pelt.

2. A pelt-refining machine, comprising a stationary frame, means for removing water-hairs from pelts mounted in the frame, a movable rocking frame set in guideways affixed to the stationary frame; a stretcher-bar, means for intermittently feeding the pelt over the stretcher-bar and a device for retaining the fur on one side of the stretcher-bar mounted in the rocking frame; a stationary guard mounted in the stationary frame in proximity to the hair-removing devices and to the path of the stretcher-bar; means for actuating the rocking frame and the hair-removing devices and means for drawing out the fur and the hair of the pelt, fed over the stretcher-bar from underneath the fur-retaining device, and for forcing it over the edge thereof.

3. A pelt-refining machine comprising a stationary frame, means for removing water-hairs from pelts mounted in the frame, a vertically-movable rocking frame set in the stationary frame, a shaft mounted in the stationary frame, a stretcher-bar and means for drawing the pelt over the stretcher-bar mounted in the rocking frame, eccentrics set on the shaft and means for pivotally connecting the rocking frame with the eccentrics, a balancing fly-wheel mounted on the shaft and having a counterweight affixed thereto opposite to the eccentrics operating the rocking frame.

4. A pelt-unhairing machine, comprising a stationary frame, shearing-knives movably mounted upon the stationary frame; a vertically-movable rocking frame set in the stationary frame, means for stretching and intermittently feeding a pelt, mounted in the rocking frame, a shaft mounted in the stationary frame, cams and eccentrics set on the shaft, pivotal joints connecting the rocking frame to the eccentrics set on the shaft, longitudinally-movable bars set in guideways affixed to the stationary frame and engaging with the cams set on the shaft, brackets affixed to the knives and bell-crank levers pivotally mounted on the stationary frame and engaging with the brackets and with the longitudinally-movable bars.

5. A pelt-refining machine comprising a stationary frame, devices for removing water-hairs from pelts and mechanism for operating these devices mounted upon the stationary frame; a vertically-movable rocking frame set in guideways affixed to the stationary frame; a stretcher-bar, a fur-retaining device and means for intermittently feeding the pelts mounted in the rocking frame, a shaft mounted in the stationary frame, cams and eccentrics set on the shaft, pivotal joints connecting the rocking frame to the eccentrics set on the shaft, longitudinally-movable bars, set in guideways affixed to the stationary frame and engaging with the mechanisms operating the devices for removing the water-hairs and with the cams set on the shaft, rollers mounted on pins, set in the ends of the bars, a rotary brush and a fur-retaining device mounted in the stationary frame, means for driving the shaft and means for rotating the brush.

6. A stretcher-bar for pelt-refining machines having two bearing edges and a flat strip intervening between the bearing edges, both the bearing edges and the intervening flat strip being situated outside of the plane of the body of the bar.

7. A stretcher-bar for pelt-refining machines having two bearing edges and a flat strip, intervening between the bearing edges, disposed at an obtuse angle to the plane of the body of the bar.

8. A fur-retaining device comprising a stretcher-bar, oscillating arms hinged to the supports of the stretcher-bar, a brushing device mounted on the arms, contractile springs, connecting the oscillating arms to the stretcher-bar, slotted appendices to the oscillating arms projecting beyond their pivotal connection, a plate having screw-threaded bores secured to the stretcher-bar and set-screws screwed through the slots of the appendices in the corresponding bores of the plate.

9. A fur-retaining device comprising a stretcher-bar, a rotary brush mounted on oscillating arms hinged to the supports of the stretcher-bar, contractile springs connecting the arms to the stretcher-bar and means for adjusting the position of the brush relative to the stretcher-bar.

10. Mechanism for operating shearing-knives of an unhairing-machine, comprising plates supporting the knives, guideways affixed to the frame of the machine, blocks, affixed to the plates and fitted in the guideways, brackets affixed to the blocks, bell-crank levers pivoted to the frame of the machine and engaging with the brackets and means for actuating the bell-crank levers.

11. Mechanism for operating shearing-knives of an unhairing-machine, comprising plates supporting the knives, transverse bores provided in the plates and recoil-springs set in the bores; plungers set in the frame of the machine and engaging with the springs, guideways affixed to the frame of the machine, blocks affixed to the plates and fitted in the guideways, means for moving the knives against the springs and means for releasing the knives.

12. The combination with movable plates, shearing-knives mounted upon them and with mechanism for operating shearing-knives of an unhairing-machine, of mechanism for diminishing the force and speed of the knives at the end of stroke, comprising movable plugs and recoil-springs set in bores provided in the plates supporting the knives and pins set in the frame of the machine in position to engage with the plugs.

In witness that we claim the improvements described in the foregoing specification we have signed our names in the presence of two subscribing witnesses.

PERCY F. COMSTOCK.
ANTON HEDBAVNY.

Witnesses:
JOHN A. PAULSON,
ROBERT VALENTINE MATHEWS.